Sept. 27, 1955　　　　　　F. NICHOLS　　　　　　2,718,682
FASTENERS
Filed Sept. 2, 1952
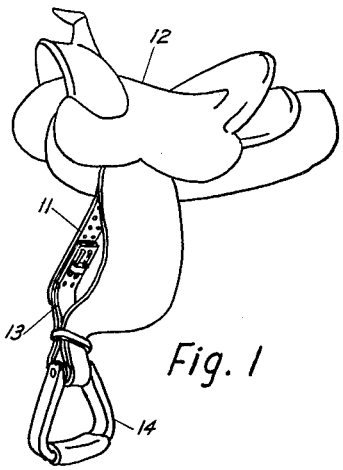
Fig. 1
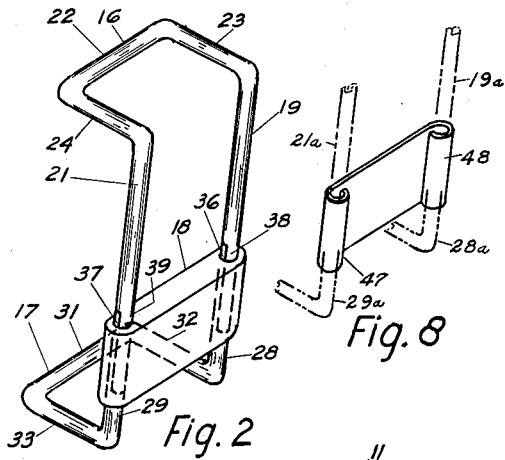
Fig. 2　　Fig. 8
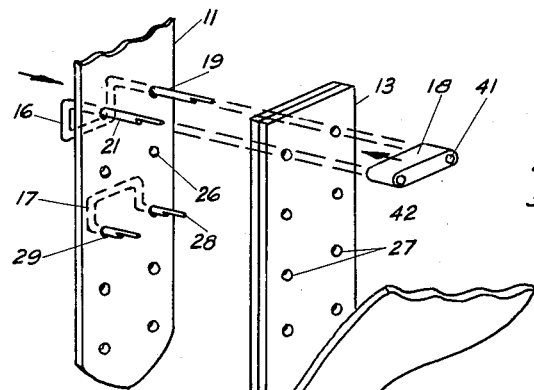
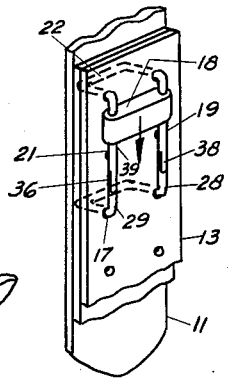
Fig. 4
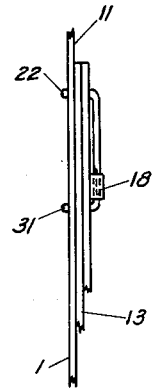
Fig. 5
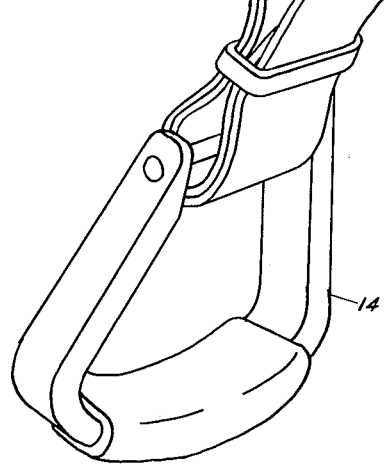
Fig. 3
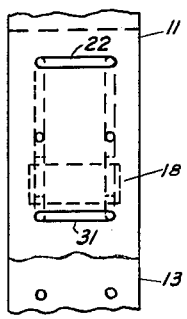
Fig. 6
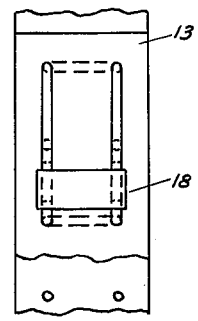
Fig. 7
INVENTOR.
Floyd Nichols
BY Llewellyn A. Young
His Attorney

United States Patent Office 2,718,682
Patented Sept. 27, 1955

2,718,682

FASTENERS

Floyd Nichols, Imlay, Nev.

Application September 2, 1952, Serial No. 307,409

4 Claims. (Cl. 24—150)

This invention relates to a separable multi-member fastener for overlapping sheet members and more particularly to overlapping straps, such as are used in adjusting the distance of a foot stirrup from a saddle.

An object of this invention is the provision of a fastener that is simple in construction, that is easy to manufacture, that is easy to manipulate and that is inexpensive to manufacture.

Another object of the invention is the provision of a stirrup strap fastener that will not skin or bruise the side of a horse.

Another object of the invention is the provision of a fastener for overlapping straps that does not encircle the straps.

Another object of the invention is the provision of a fastener that minimizes wear on the overlapping members that are held thereby.

Another object of the invention is the provision of a fastener that does not require any special riveting or sewing to place the fastener in an operative position.

Another object of the invention is the provision of a fastener that does not require the use of a movable tongue.

Another object of the invention is the provision of a fastener that does not have any projecting parts which will catch on other objects.

Another object of the invention is the provision of a fastener that may be used equally well on either side of overlapping strap members.

Another object of the invention is the provision of a fastener that has a neat and clean appearance.

Another object of the invention is the provision of a fastener for overlapping straps that easily permits the ready adjustment of one strap relative to the other.

Another object of the invention is the provision of a fastener that is positive in its action.

Other objects and advantages will become more apparent upon reference to the accompanying drawings in which:

Figure 1 shows the fastener embodying the present invention applied to overlapping straps for adjusting the length of a stirrup from a saddle.

Figure 2 is an enlarged perspective view of the fastener.

Figure 3 is an enlarged view showing the method of applying the fastener on overlapping straps.

Figure 4 indicates the position of the fastener on overlapping straps prior to locking it in position.

Figure 5 is a side view showing the fastener in its locked position holding overlapping straps in a desired adjusted position.

Figure 6 is a view similar to Figure 5 showing one face view of the straps and fastener and Figure 7 is the opposite face view of the straps and fastener.

Figure 8 shows a modified form of the invention.

While the clasp or fastener contemplated by this invention may be used for holding any overlapping sheet-like members in a desired relative position with respect to one another, for purposes of illustration the fastener is designed for holding overlapping stirrup straps 11 and 13 in a desired adjusted position. As shown in Figures 1 and 3, the strap 11 is a fixed strap having one end anchored onto the saddle 12, and the strap 13 which supports the stirrup 14 mates with strap 11 and when held in a desired adjusted position by the fastener holds the stirrup 14 at a fixed distance from the saddle 12.

The fastener is best shown in Figure 2 and comprises generally U-shaped or hairpin-shaped members 16 and 17 and a locking member 18. The U-shaped member 16 includes legs or prongs 19 and 21, a bridging portion 22, and connecting portions 23 and 24 inclined at an angle respectively with the legs 19 and 21, and interconnecting the latter with the bridging portion 22. The length of connecting portions 23 and 24 preferably equals the thickness of both the straps 11 and 13. In this embodiment of the invention the connecting portions 23 and 24 are at right angles to the legs 19 and 21 respectively and thereby position the bridging portion 22 at one side of the legs. The leg portions 19 and 21 are spaced apart the distance of the spaced holes 26 and 27 on the straps 11 and 13.

The U-shaped member 17 is of similar construction and includes a pair of legs or prongs 28 and 29, a bridging portion 31, and connecting portions 32 and 33 interconnecting the legs 28 and 29 with the bridging portion 31. The legs 28 and 29 are spaced apart the same distance as the holes 26 and 27 and the connecting portions 32 and 33 are at right angles to the legs. The length of the legs 19 and 21 and the legs 28 and 29 may be of any desired length, taking into consideration the spacing between the holes 26 and 27, so long as when in end-to-end relation, as shown in Figure 2, the locking means 18 engages the legs of both members 16 and 17. As shown herein, the legs 28 and 29 are shorter than the legs 19 and 21. The advantage of this construction is shown in Figure 5. Thus, the legs 28 and 29 are correlated with the locking means 18 so that when it is in its locking position the locking means substantially rests on the connecting members 32 and 33 of the member 17. If the legs 28 and 29 are made very long and not correlated with the locking means 18, a stop must be provided for holding the locking means 18 in its locking position.

The legs or prongs 19 and 21 of the member 16 are arranged to be in end to end alignment with the legs or prongs 28 and 29 of member 17 when the members 16 and 17 are in a fastening position as shown in Figures 2 and 5.

In the embodiment of the invention shown, the legs 19 and 21 are formed with rabbet joints to receive tongue portions 36 and 37 of the legs 28 and 29 respectively and the legs 28 and 29 are formed with rabbet joints to receive tongue portions 38 and 39 of the legs 19 and 21 respectively.

The locking member 18 in this form of the invention is shown as a solid member having openings 41 and 42 as best shown in Figure 3 extending lengthwise of the member. The openings 41 and 42 are spaced apart the distance between the legs 19 and 21 or the legs 28 and 29 and are of slightly larger diameter than the legs so that the locking member may be moved lengthwise of the legs 19 and 21 or 28 and 29. As shown in Figure 2 the locking member 18 circles the mating portions of the legs 19 and 28 and 21 and 29 respectively and holds the legs against movement relative to each other. When the locking member is in the position shown in Figure 4 the members 16 and 17 may be moved with respect to each other.

The manner of utilizing the fastener is best illustrated in Figures 3 through 7 inclusive. In Figure 3 the legs 19 and 21 of the member 16 project through a pair of holes 26 in the strap 11 and are in position to project through the holes 27 in the strap 13 when the latter is brought into contiguous overlapping relation with the strap 11. In a similar manner legs 28 and 29 of the member 17 project through a pair of holes 26 in the strap 11 and are in position to project through mating holes 27 in the strap 13.

In Figure 4 it can be seen that when straps 11 and 13 are in contiguous relation the member 16 has been moved bodily so that its legs 19 and 21 are in parallel, substantially contiguous relation with strap 13 throughout their entire length, and the bridging portion 22 engages the outer side of the strap 11. In a similar manner the member 17 has been bodily moved so that the legs 28 and 29 are in parallel, substantially contiguous relationship with the strap 13 throughout their length and the bridging portion 31 engages the outer side of the strap 11. The tongue portions 36 and 37 are received in the respective rabbet joints of the legs of the member 16 and the tongue portions 38 and 39 are received in the respective rabbet joints of the legs of the member 17. The locking member 18 may be slipped on the legs 19 and 21 as soon as the legs project through the strap 13 and when the member 16 is shifted bodily to the position shown in Figure 4 the locking member 18 is moved to the position shown. When the respective legs of the members 16 and 17 are in aligned end-to-end relation the locking member 18 is moved to the position shown in Figures 5 and 7 and is held there by gravity. To remove the fastener the locking means 18 is moved from the position shown in Figure 5 to the position shown in Figure 4. The members 16 and 17 may then be disengaged from the straps.

With this construction the connecting portions 23 and 24 of the member 16 and the connecting portions 32 and 33 of the member 17 hold the overlapping straps 11 and 13 against lengthwise or shearing movement, and the bridging portions 22 and 31, and the legs of the members 16 and 17, and the locking means 18 provide a construction for holding the connecting portions in position.

There are many advantages of this construction as can be seen from the aforegoing. This fastener can be applied to either side of the overlapping straps. Also this fastener may be quickly, easily, and readily applied. It is simple to construct and positive in its action. This construction also provides a maximum resistance against movement of one strap relative to another while at the same time minimizing wear on the straps. This fastener does not encircle the straps or provide projecting surfaces or corners for snagging objects. The fastener is small and compact and consequently when used as a stirrup strap fastener will not skin or bruise a horse as is the case with some existing designs. This fastener also has a neat, clean appearance and there are no tongues to get out of order. This fastener is also extremely inexpensive to produce.

I claim:

1. A separable multi-member clasp for securing overlapping straps having pairs of spaced holes thereon in a predetermined position comprising: a first independent generally U-shaped member including a pair of spaced, parallel, elongated legs adapted to fit in said spaced holes on said straps and adapted to be in contiguous relation with one of said straps, a bridging member adapted to engage the other of said straps, and means extending at an angle to each end of the bridging member connecting said ends to an adjacent end of an adjacent leg for securing said bridging member to said legs and spacing the bridging member from said legs to permit the reception of said overlapping straps therebetween; a second independent generally U-shaped member including a second pair of spaced, parallel, elongated legs spaced apart the distance of said holes and arranged to be in contiguous relation with the same strap as said first pair of legs, said second pair of legs being spaced to be in alignment with said first pair of legs when said pairs of legs are positioned in end-to-end relation; a second bridging member adapted to engage the same strap as said first bridging member and means extending at an angle to each end of the bridging member connecting said ends to an adjacent end of an adjacent leg for securing said second bridging member to said second pair of legs and spacing said second bridging member from said second pair of legs to permit the reception of said overlapping strap therebetween; and means shorter than the shortest of said pairs of elongated legs encircling one of said legs of one of said members, slidably mounted thereon, and movable between a position in which it embraces a portion of one leg of the other of said members and a portion of the leg of the member on which it is mounted to form a lock for holding said U-shaped members in the aforegoing described end-to-end relation to hold said overlapping straps in a preselected position.

2. A separable multi-member fastening clasp including: a first independent generally U-shaped member comprising spaced, generally parallel legs, a bridging portion at one side of the plane of the legs, and means interconnecting the bridging portion with the legs; a second independent generally U-shaped member comprising second spaced, generally parallel legs spaced apart the same distance as said first legs and adapted when disposed in end-to-end relation with said first pair of legs to be in alignment therewith, a second bridging portion at one side of the plane of said legs, and means interconnecting the second bridging portion with said second spaced legs; and slidable locking means comprising a body having at least one opening for receiving one of said legs, and being shorter than the shortest of said pairs of legs, said body being mounted on at least one of said legs and movable between opposed positions, said body being arranged in one position to positively hold said legs in alignment when said legs are positioned in end-to-end relation and in its other position permitting movement of the legs relative to each other as required for assembly and disassembly of said fastening clasp.

3. A separable multi-member fastening clasp including: a first independent generally U-shaped member comprising spaced, generally parallel legs and a bridging portion, one end of said legs being formed with a rabbet joint and the opposite end being inclined at an angle to the main portion of the legs to disposed said bridging portion at one side of said main portion of the legs; a second independent generally U-shaped member comprising second spaced, generally parallel legs spaced apart the same distance as said first legs and adapted when disposed in end-to-end relation with said first pair of legs to be in alignment therewith and a second bridging portion, one end of said legs being formed with a rabbet joint to mate with the rabbet joint on said first spaced legs, and the opposite end of said second legs being inclined at any angle to the main portion of the second pair of legs to dispose said bridging portion at one side of said main portion of the second pair of legs, and slidable leg-encircling means of less length than the shortest pair of said legs, movable between a position in which the rabbet joints of the legs may be matched and a position in which the legs are held in position after the rabbet joints on aligned legs are matched.

4. A separable multi-member fastener for securing overlapping straps having spaced holes thereon in a predetermined position comprising: a first independent member having an elongated prong portion arranged to be in substantially contiguous relation with one of said straps, means adapted to engage the other of said straps, and means interconnecting said prong and said last-mentioned means; a second independent member including a second elongated prong portion adapted to be in substantially contiguous relation with the same strap as said first prong portion and in end-to-end relation with said first elongated prong portion, second means adapted to engage the other of said straps and second means interconnecting said second elongated prong portion and said last-mentioned second means; and slidable means shorter than the shortest of said prong portions and encircling one of said prong portions, said means being movable between a position in which it engages both prong portions to hold them in end-to-end relation, and a position in which said members may be moved bodily with respect to each other.

References Cited in the file of this patent

UNITED STATES PATENTS

| | | |
|---|---|---|
| 687,028 | Horning | Nov. 19, 1901 |
| 740,888 | May | Oct. 6, 1903 |
| 789,862 | Lilley | May 16, 1905 |
| 883,220 | Middlebrook | Mar. 31, 1908 |
| 949,707 | Iannelli | Feb. 15, 1910 |
| 2,419,788 | Nickell | Apr. 29, 1947 |

FOREIGN PATENTS

| | | |
|---|---|---|
| 84,745 | Germany | of 1896 |
| 10,592 | Austria | Feb. 10, 1903 |
| 403,052 | Great Britain | of 1933 |